US012423412B1

(12) United States Patent
Liu et al.

(10) Patent No.: US 12,423,412 B1
(45) Date of Patent: Sep. 23, 2025

(54) METHOD, APPARATUS, DEVICE, AND STORAGE MEDIUM FOR CDN SERVICE ORCHESTRATION IN MULTI-CLOUD ENVIRONMENT

(71) Applicant: Beijing Volcano Engine Technology Co., Ltd., Beijing (CN)

(72) Inventors: Jiawei Liu, Beijing (CN); Yisheng Jiang, Beijing (CN); Jian Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 19/064,080

(22) Filed: Feb. 26, 2025

(30) Foreign Application Priority Data

Mar. 21, 2024 (CN) .......................... 202410330258.1

(51) Int. Cl.
*G06F 21/00* (2013.01)
*G06F 21/53* (2013.01)
(52) U.S. Cl.
CPC ........ *G06F 21/53* (2013.01); *G06F 2221/033* (2013.01)
(58) Field of Classification Search
CPC .................... G06F 21/53; G06F 2221/033
See application file for complete search history.

(56) References Cited

U.S. PATENT DOCUMENTS

2015/0363598 A1    12/2015   Xu et al.
2021/0019194 A1    1/2021   Bahl et al.
2022/0129564 A1    4/2022   Hecht
(Continued)

FOREIGN PATENT DOCUMENTS

CN    111464585 A    7/2020
CN    111884855 A    11/2020
(Continued)

OTHER PUBLICATIONS

China National Intellectual Property Administration, Search Report Issued in Application No. 202410330258.1, May 8, 2024, 1 page.
(Continued)

*Primary Examiner* — Ghazal B Shehni
(74) *Attorney, Agent, or Firm* — Alleman Hall & Tuttle LLP

(57) ABSTRACT

The present disclosure proposes a method and an apparatus, a device, and a storage medium for CDN service orchestration in a multi-cloud environment. The method includes: receiving a first orchestration script, where the first orchestration script is used for orchestrating a content delivery network CDN service provided by a plurality of target objects; verifying and storing evidence of the first orchestration script in a trusted execution environment; generating, in the trusted execution environment, a unique verification code corresponding to a second orchestration script, where the second orchestration script is an orchestration script that is successfully verified in the first orchestration script; transmitting the second orchestration script to a designated target object, and receiving an orchestration execution result returned by the designated target object; and transmitting the orchestration execution result and the unique verification code to a sender of the first orchestration script.

20 Claims, 5 Drawing Sheets

(56) References Cited

U.S. PATENT DOCUMENTS

| | | | |
|---|---|---|---|
| 2022/0200806 A1 | 6/2022 | Grobelny et al. | |
| 2022/0398119 A1* | 12/2022 | Kim | G06F 9/45558 |
| 2023/0148158 A1* | 5/2023 | Bandarupalli | H04L 67/1008 |
| | | | 709/224 |
| 2023/0247044 A1* | 8/2023 | Luttwak | H04L 63/20 |
| | | | 726/1 |
| 2024/0061751 A1* | 2/2024 | Janarthanam | G06F 11/2097 |
| 2024/0146735 A1* | 5/2024 | Liu | H04L 63/10 |
| 2024/0348501 A1* | 10/2024 | Quan | G06F 8/71 |
| 2025/0077301 A1* | 3/2025 | Arunachalam | G06F 8/65 |

FOREIGN PATENT DOCUMENTS

| | | |
|---|---|---|
| CN | 114237871 A | 3/2022 |
| CN | 115914219 A | 4/2023 |
| CN | 117034230 A | 11/2023 |
| CN | 117938405 A | 4/2024 |
| EP | 3671508 B1 | 7/2023 |
| WO | 2023035507 A1 | 3/2023 |

OTHER PUBLICATIONS

International Search Report and Written Opinion for International Application No. PCT/CN2025/077120, mailed May 16, 2025, 16 pages.

European Patent Office, Extended European Search Report Issued in Application No. 25160417.9, Jul. 11, 2025, 11 pages.

Jalalpour, E. et al., "A Security Orchestration System for CDN Edge Servers," Proceedings of the 2018 4th IEEE Conference on Network Softwarization and Workshops (NetSoft), Jun. 25, 2018, Montreal, Canada, 10 pages.

\* cited by examiner

METHOD, APPARATUS, DEVICE, AND STORAGE MEDIUM FOR CDN SERVICE ORCHESTRATION IN MULTI-CLOUD ENVIRONMENT

CROSS-REFERENCE TO RELATED APPLICATION(S)

This application claims priority to Chinese Application No. 202410330258.1 filed on Mar. 21, 2024, the disclosure of which is incorporated herein by reference in its entirety.

FIELD

The present disclosure relates to the field of cloud computing, and in particular, to a method and apparatus, a device, and a storage medium for content delivery network (CDN) service orchestration in a multi-cloud environment.

BACKGROUND

With the development of Internet technologies, content delivery network (CDN) technology has become one of the key technologies for improving network performance. At present, when users use CDN services, they usually select a multi-cloud solution, that is, they use CDN services provided by multiple cloud service providers at the same time. Users may indirectly orchestrate CDN services provided by multiple cloud service providers through a multi-cloud service.

SUMMARY

In view of this, one or more implementations of the present disclosure provide a method and an apparatus, a device, and a storage medium for CDN service orchestration in a multi-cloud environment, which may improve transparency and trustworthiness of a CDN service orchestration process.

In an aspect, the present disclosure provides a method for CDN service orchestration in a multi-cloud environment, including:
  receiving a first orchestration script, where the first orchestration script is used for orchestrating a content delivery network CDN service provided by a plurality of target objects;
  verifying and storing evidence of the first orchestration script in a trusted execution environment;
  generating, in the trusted execution environment, a unique verification code corresponding to a second orchestration script, where the second orchestration script is an orchestration script which is successfully verified in the first orchestration script;
  transmitting the second orchestration script to a designated target object, and receiving an orchestration execution result returned by the designated target object; and
  transmitting the orchestration execution result and the unique verification code to a sender of the first orchestration script.

In another aspect, the present disclosure further provides an apparatus for CDN service orchestration in a multi-cloud environment, including:
  a first receiving module, configured to receive a first orchestration script, where the first orchestration script is used for orchestrating a content delivery network CDN service provided by a plurality of target objects;
  a verification module, configured to verify and store evidence of the first orchestration script in a trusted execution environment;
  a code generation module, configured to generate, in the trusted execution environment, a unique verification code corresponding to a second orchestration script, where the second orchestration script is an orchestration script which is successfully verified in the first orchestration script;
  a first sending module, configured to transmit the second orchestration script to a designated target object;
  a second receiving module, configured to receive an orchestration execution result returned by the designated target object; and
  a second sending module, configured to transmit the orchestration execution result and the unique verification code to a sender of the first orchestration script.

In another aspect, the present disclosure further provides an electronic device, including a memory and a processor, the memory is configured to store a computer program, and the computer program, when executed by the processor, causing processor to perform the method for CDN service orchestration in the multi-cloud environment described above.

In another aspect, the present disclosure further provides a computer-readable storage medium, configured to store a computer program, and the computer program, when executed by a processor, causes processor to perform the method for CDN service orchestration in the multi-cloud environment described above.

According to the technical solution provided in one or more implementations of the present disclosure, the multi-cloud service may verify and store evidence of the first orchestration script in the trusted execution environment, to ensure trustworthiness of the first orchestration script. The multi-cloud service may generate, in the trusted execution environment, the unique verification code corresponding to the second orchestration script, to ensure trustworthiness of the unique verification code. The unique verification code may be used as evidence to ensure trustworthiness of the second orchestration script. In addition, a result of storing evidence and content included in the unique verification code may record a process of the multi-cloud service for processing the orchestration script, and increase transparency of the multi-cloud service for processing the orchestration script.

BRIEF DESCRIPTION OF THE DRAWINGS

The features and advantages of the embodiments of the present disclosure will be more clearly understood by referring to the drawings, which are illustrative and should not be construed as limiting the present disclosure. In the drawings.

DETAILED DESCRIPTION OF EMBODIMENTS

In order to make the objectives, technical solutions and advantages of the implementations of the present disclosure clearer, the technical solutions in the implementations of the present disclosure will be described clearly and completely below with reference to the drawings in the implementations of the present disclosure. Obviously, the described implementations are part of the implementations of the present disclosure, rather than all of the implementations. All other implementations obtained by those skilled in the art based on the implementations in the present disclosure without creative efforts shall fall within the protection scope of the present disclosure.

Existing methods for orchestrating CDN services through multi-cloud services have defects such as low transparency and insufficient trustworthiness. It is difficult for users to audit orchestration behaviors of the multi-cloud service. When a CDN service runs below expectations, it is difficult for users to determine whether the problem lies in a cloud service provider or the multi-cloud service.

In view of this, at present, a more transparent and trustworthy CDN service orchestration method in a multi-cloud environment is needed.

According to the technical solution provided in one or more implementations of the present disclosure, when a user orchestrates content delivery network services provided by multiple cloud service providers through a multi-cloud service, it can be ensured that the orchestration behavior of the multi-cloud service is trustworthy and transparent.

Figure 1:
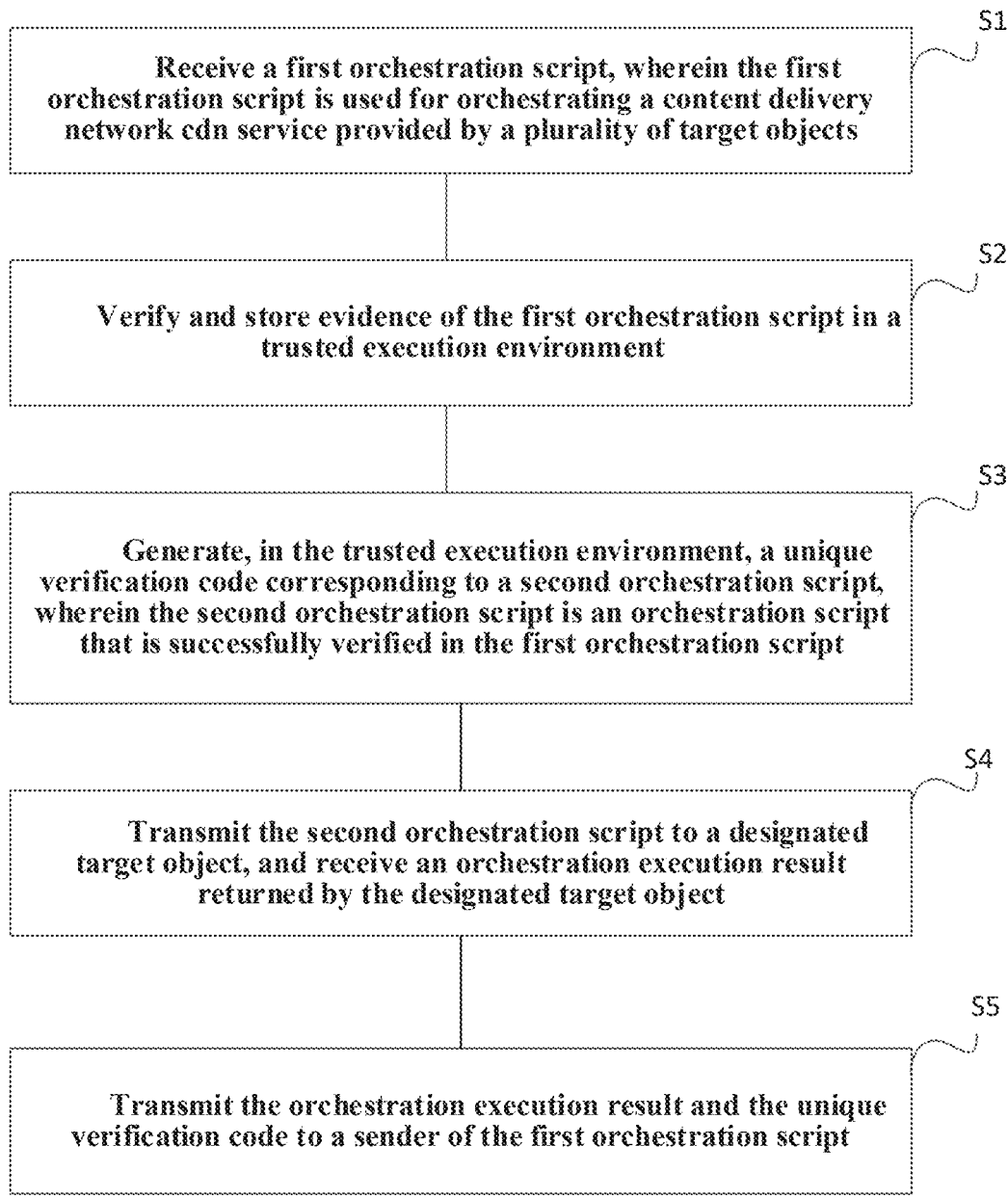
FIG. 1 is a schematic flowchart of a method for CDN service orchestration in a multi-cloud environment according to an embodiment of the present disclosure.

Referring to FIG. 1, a method for CDN service orchestration in a multi-cloud environment provided in an implementation of the present disclosure may include the following steps.

S1: Receive a first orchestration script, and the first orchestration script is used for orchestrating a content delivery network service provided by multiple target objects.

In this implementation, the multiple target objects refer to multiple cloud service providers, which may also be referred to as Infrastructure as a Service (IaaS) providers. Orchestrating the content delivery network service may be a process of using an automated tool to manage and configure content delivery network resources.

An orchestration script may be an executable file used for automated configuration, management, and coordination of computer systems, applications, and services. In a cloud service environment, developers and system administrators may use an orchestration script to automate complex tasks, such as deploying and managing content delivery network services. Alternatively, the orchestration script is declarative and illustrates the final state required to be achieved by an orchestrated object.

Specifically, a cloud service provider may provide an open application programming interface (OpenAPI), so that a user may control and manage cloud resources in a programming manner. The user may write an orchestration script by using an infrastructure as code (IaC) tool to define required cloud resources. The IaC tool may read the orchestration script, convert the orchestration script into an application programming interface for calling, and create and manage cloud resources at the cloud service provider. The cloud resources may include content delivery network resources.

In an actual application example, the first orchestration script may be implemented by using the IaC tool Terraform. The user may use HashiCorp Configuration Language (HCL), which is a declarative configuration language, to define and manage various cloud services and cloud resources, to implement automated deployment and management of cloud infrastructure. The first orchestration script may define cloud resources provided by a cloud service provider, including the origin, cache behavior, price strategy, and geographical restrictions of the cloud resources. When the first orchestration script is performed, Terraform ensures that the configurations of cloud resources in cloud service providers match the state defined in the script. If the current state of a cloud resource is inconsistent with the state defined in the script, Terraform may perform necessary operations to bring the cloud resource to the state defined in the script.

In this implementation, the user service may complete editing of the first orchestration script, and the multi-cloud service may receive the first orchestration script sent by the user service, and perform subsequent steps.

In this implementation, in the process of the multi-cloud service receiving the first orchestration script sent by the user service, the method for transmitting the first orchestration script includes but is not limited to an application programming interface call, using a command line tool, using a continuous integration/continuous deployment tool, direct file transmission, using an infrastructure as code tool, using a version control system, and via a cloud management platform.

Alternatively, when the first orchestration script is transmitted through an application programming interface call, the user service may upload the orchestration script using an application programming interface provided by the multi-cloud service. This process may be completed through an HTTPS request using a RESTful API or a specific software development kit (SDK).

Alternatively, when the first orchestration script is transmitted using the command line tool, the user service may use the command line tool to execute the first orchestration script and communicate with the application programming interface provided by the multi-cloud service.

Alternatively, when the first orchestration script is transmitted using the continuous integration/continuous deployment tool, the user service may use continuous integration/continuous deployment tools, such as Jenkins, GitLab CI, and GitHub Actions, to automatically upload the first orchestration script.

Alternatively, when the first orchestration script is transmitted through direct file transmission, the user service may use a standard file transfer protocol, such as SFTP or SCP, to securely upload the first orchestration script to the multi-cloud service.

Alternatively, when the first orchestration script is transmitted using the infrastructure as code tool, the user service may use IaC tools such as Terraform and Ansible to transmit the first orchestration script directly from a local or version control system.

Alternatively, when the first orchestration script is transmitted using the version control system, the user service may use version control systems, such as Git and SVN, to store and version the first orchestration script, and the multi-cloud service may directly pull the latest version of the script from these version control systems.

Alternatively, when the first orchestration script is transmitted through the cloud management platform, some enterprise-level cloud management platforms support multi-cloud management, and users may deploy and manage orchestration scripts through a unified interface.

In this implementation, the process of deploying and managing content delivery network resources through the first orchestration script becomes automated and efficient. In the multi-cloud environment, users may use services of multiple cloud service providers in combination, which improves flexibility and reliability of the content delivery network.

S2: Verify and store evidence of the first orchestration script in a trusted execution environment.

In this implementation, the trusted execution environment (TEE) may load code and data participating in computation into a trusted environment protected by the CPU based on a hardware security mechanism, to provide protection in terms of confidentiality and integrity. The TEE may have a higher level of security than an operating system, and may process sensitive data. The TEE in this implementation may be based on the X86 instruction set architecture or the ARM instruction set architecture. In this implementation, since the TEE provides a secure environment, execution security of the first orchestration script may be ensured even on an untrusted operating system.

In this implementation, verifying and storing evidence of the first orchestration script may be performing identity an verification on the first orchestration script to record a process and a result of the identity verification.

The identity verification on the first orchestration script may be used to check whether the first orchestration script is published by a trusted source, and may be implemented by means of verifying a digital signature.

Specifically, a sender of the first orchestration script may sign the first orchestration script with a signature private key before sending the first orchestration script, and a receiver of the first orchestration script may use a corresponding signature public key to confirm validity of the signature. When the signature verification succeeds, it may indicate that the identity verification on the first orchestration script succeeds, proving that the first orchestration script has not been tampered with. The process and result of the identity verification on the first orchestration script may be recorded and stored in the trusted execution environment. The process and result of the identity verification on the first orchestration script may include the verification process and result of the digital signature.

If the first orchestration script fails the identity verification, a specific reason for the identity verification failure may be recorded in the trusted execution environment.

In this implementation, verifying and storing evidence of the first orchestration script may be performing security auditing on the first orchestration script to record a process and a result of the security auditing.

The security auditing on the first orchestration script may be used to check whether the first orchestration script contains malicious code or operations, and may be implemented by static code analysis, dependency checking, and runtime behavior monitoring.

Specifically, a series of security checks may be directly performed on the first orchestration script, and details and results of these checks, such as results of static code analysis, results of dependency checking, and any security issues found, may be recorded at the same time. The first orchestration script may also be executed test-wise, and the execution process may be recorded in detail, including the time when the execution starts, specific steps of the execution, any exceptions or errors that occur, and the time when the execution is completed. If no security issues are found in the first orchestration script after security checking is performed using the above method, or if the number and severity of security issues do not reach a preset upper limit, it may be confirmed that the first orchestration script passes the security auditing.

If the first orchestration script fails the security auditing, a specific reason for the security auditing failure may be recorded in the trusted execution environment.

In this implementation, verifying and storing evidence of the first orchestration script may be performing an executable test on the first orchestration script to record a process and a result of the executable test.

The executable test on the first orchestration script may be used to check whether the first orchestration script runs according to its design purpose.

Specifically, output of the first orchestration script after the execution test may be recorded, including a return status of the script, data generated, resources affected, and any output log information. The output result may be compared with a design objective of the first orchestration script, to determine whether the first orchestration script achieves an expected effect. System status and environmental information of the first orchestration script during the execution test may also be recorded, such as the CPU usage, memory usage, and network status, to analyze the working efficiency and reliability of the first orchestration script. If the executable test is performed using the above method, when indicators of the test result meet preset conditions, the first orchestration script is determined to pass the executable test.

If the first orchestration script fails the executable test, a specific reason for the failure of the executable test may be recorded in the trusted execution environment.

In some implementations, the content of verifying and storing evidence of the first orchestration script may include one or more of identity verification, security auditing, and the executable test, and may further include other verification and evidence storing behaviors. The strictness and specific steps of the verification process may be different according to actual implementation details and security requirements.

In some implementations, the verifying and storing evidence of the first orchestration script may form a continuous audit chain based on records formed after evidence is stored, which may be used to prove the legality and security of the first orchestration script. The process of verification and evidence storing is implemented in the trusted execution environment, which may ensure that the audit chain is not tampered with.

Figure 2:
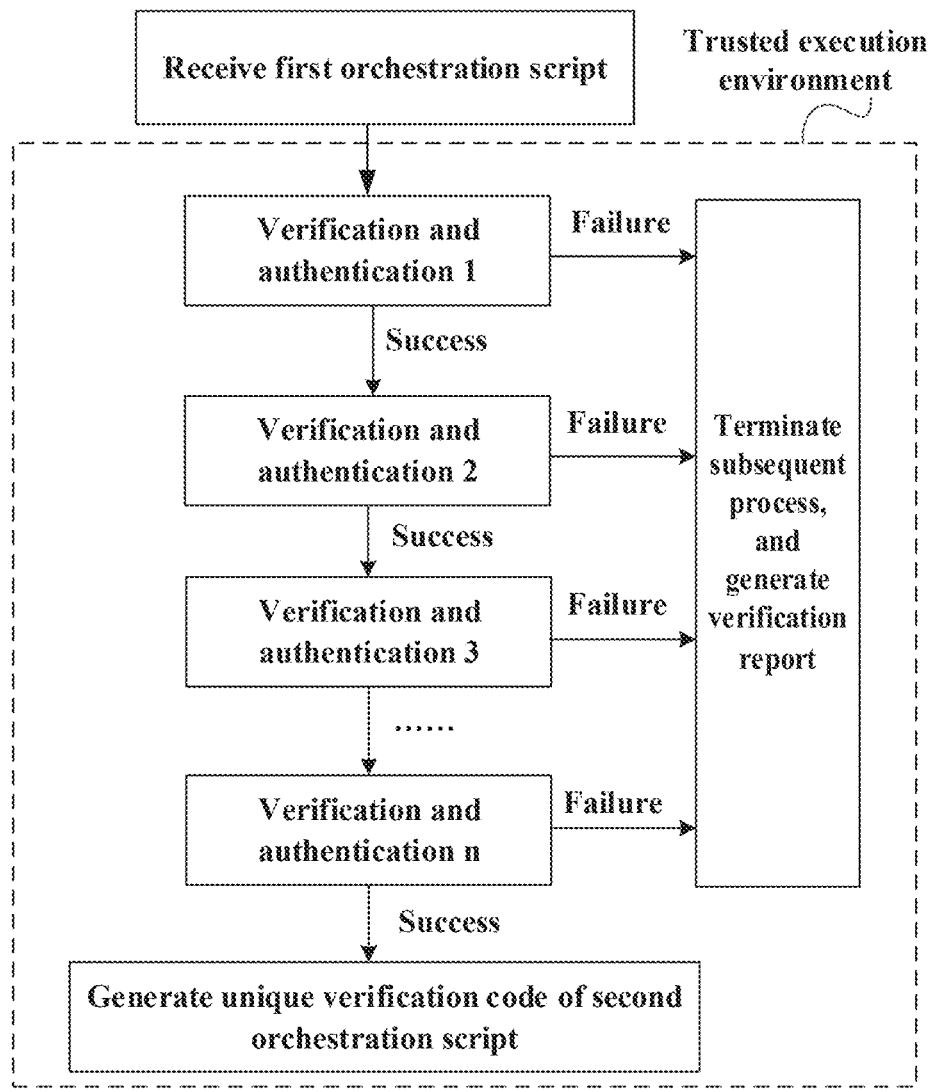
FIG. 2 is a flowchart of verifying and storing evidence of a first orchestration script according to an embodiment of the present disclosure.

In some implementations, referring to FIG. 2, the process of verifying the first orchestration script in the trusted execution environment may be automated, and a subsequent verification stage is entered only when a previous verification stage of the first orchestration script is passed. When all verification stages are passed, subsequent steps are executed. When a verification stage of the first orchestration script fails, execution of a subsequent verification stage or subsequent steps of the first orchestration script is terminated, and a verification report indicating a reason for verification failure is generated. Alternatively, the verification report may be in the form of an error code with an indication meaning, or a text with a detailed description.

S3: Generate, in the trusted execution environment, a unique verification code corresponding to a second orchestration script, wherein the second orchestration script is an orchestration script which is successfully verified in the first orchestration script.

In this implementation, after receiving the first orchestration script sent by the user service, the multi-cloud service may verify the first orchestration script in the trusted execution environment, mark the first orchestration script which has been successfully verified as the second orchestration script, and generate, in the trusted execution environment, the unique verification code corresponding to the second orchestration script. The content and form of the second orchestration script may be the same as those of the first orchestration script.

In this implementation, the unique verification code corresponding to the second orchestration script may include but is not limited to the following content: an identity identifier of an access key corresponding to the second orchestration script, a timestamp at which the second orchestration script is created or requested to be executed, a name or an identity identifier of the second orchestration script, a hash value of content of the second orchestration script, and a hash value of the second orchestration script carrying a user signature.

Specifically, the second orchestration script may perform identity authentication in the trusted execution environment in the manner of the access key and obtain the execution permission, and the identity identifier of the access key may be included in the unique verification code. The timestamp at which the second orchestration script is created or requested to be executed, the name or identity identifier of the second orchestration script, and the like may help classify and query the second orchestration script, and these content may be included in the unique verification code. The first hash value of the content of the second orchestration script may be used to prove that the second orchestration script has not been tampered with during transmission, and the first hash value may be included in the unique verification code. The first hash value may be a hash value. Before sending the second orchestration script, the sender of the second orchestration script may sign the second orchestration script with the signature private key, and may perform a hash algorithm on the second orchestration script carrying the user signature to obtain a second hash value. The second hash value included in the unique verification code may be used to verify the source and integrity of the script. The hash algorithm may be a hash algorithm, and the second hash value may be a hash value.

In an implementation, generating, in the trusted execution environment, a unique verification code corresponding to the second orchestration script may be performed by a user access key.

Figure 3:
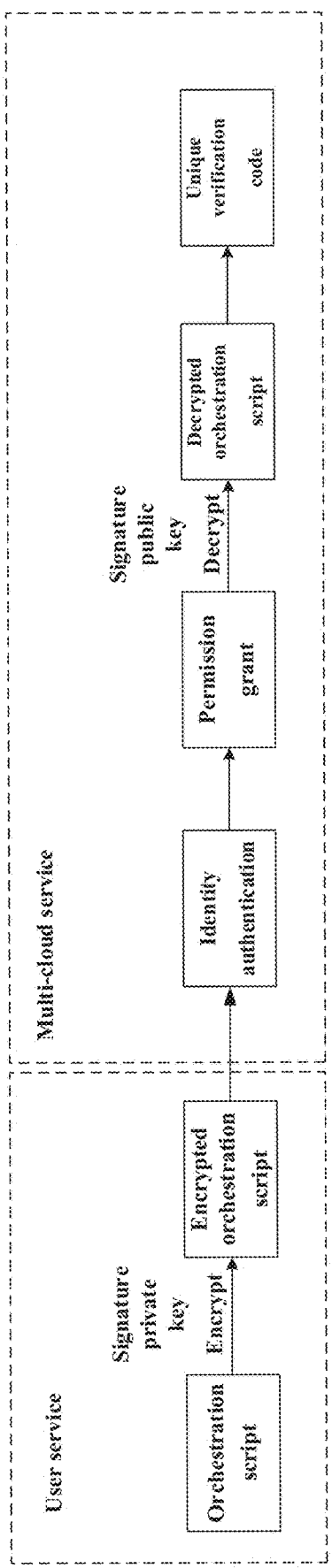
FIG. 3 is a flowchart of generating, through a user access key, a unique verification code corresponding to a second orchestration script according to an embodiment of the present disclosure.

Specifically, referring to FIG. 3, before sending the first orchestration script, the user service may use a signature private key stored by the user service to encrypt the first orchestration script, and may transmit the encrypted first orchestration script and an identity identifier of the access key to the multi-cloud service. In the trusted execution environment, the multi-cloud service may perform, based on verification of the identity identifier of the access key and a signature public key stored in the multi-cloud service, identity authentication on the first orchestration script and grant execution permission to the first orchestration script. In addition, the multi-cloud service may use the signature public key stored in the multi-cloud service to decrypt the second orchestration script, to obtain the specific content of the second orchestration script, and generate, based on the specific content of the second orchestration script, the unique verification code corresponding to the second orchestration script.

S4: Transmit the second orchestration script to a designated target object, and receive an orchestration execution result returned by the designated target object.

In this implementation, after the unique verification code is generated in the trusted execution environment, the multi-cloud service may transmit the second orchestration script to a target object involved in the second orchestration script. The designated target object may be multiple cloud service providers. After receiving the second orchestration script, each cloud service provider may execute the second orchestration script, deploy and manage its own content delivery network service, and send an orchestration execution result back to the multi-cloud service.

In this implementation, the orchestration execution result returned by the designated target object may have many possibilities, including but not limited to successful execution of the second orchestration script, failure of execution of the second orchestration script, security issues with the second orchestration script, and incompletion of the second orchestration script.

In some implementations, when the second orchestration script is successfully executed, the orchestration execution result may include an operation record and resource call information.

Specifically, the operation record may include the time when the script starts to execute, specific steps of execution, and the time when the execution is completed. The operation record may include the time when key code in the script starts to execute, specific steps of execution, and the time when the execution is completed. The operation record may include intermediate output and final output generated after the script is executed. The resource call information may include call information of system resources and network resources, such as the CPU usage, memory usage, and network status. The resource call information may include an initial snapshot, an intermediate snapshot, and a final snapshot of a resource state.

In some implementations, when the second orchestration script fails to be executed, the orchestration execution result may include a reason for failure and diagnostic information.

Specifically, the reason for failure may include the time when the script starts to execute, specific steps of execution, a step that fails to be executed, and a timestamp of the step that fails to be executed. The reason for failure may include the time when key code in the script starts to execute, specific steps of execution, a step that fails to be executed, and a timestamp of the step that fails to be executed. The reason for failure may include identification information of the step that fails to be executed, and position information of the step that fails to be executed in the script. The diagnostic information may be a general result after the script is diagnosed, such as "error code, cannot execute" and "exception description, unidentifiable". The diagnostic information may be a detailed analysis after the script is diagnosed, such as a total count of warnings and errors detected in the script, a meaning represented by each warning or error, and guidelines for each warning or error. The reason for failure and the diagnostic information may help identify the source of the problem, and may be used for troubleshooting.

In some implementations, if a security or integrity issue occurs in the execution process of the second orchestration script, an alarm may be triggered. The orchestration execution result may include the alarm information.

Specifically, the security issue may be discovery of an unauthorized access attempt. The integrity issue may be discovery of possible data loss in the second orchestration script. After a security alarm triggered by the security or integrity issue occurs, the orchestration result may include the alarm information. The alarm information includes an alarm occurrence time, a nature of an event represented by the alarm, and a severity of the event represented by the alarm.

In some implementations, after the second orchestration script is executed, if the execution result does not conform to an expected or established business rule, the orchestration execution result may record a detailed output and related difference information. Furthermore, a rollback process may be performed according to the orchestration result, to restore the CDN resource to a historical stable state.

In some implementations, after the second orchestration script is executed, if an abnormal usage pattern is formed, the orchestration execution result may record a log of abnormal usage or unusual activities (for example, frequent failed attempts or unconventional operation time). Further, in-depth analysis may be performed on the orchestration result, a related team may be notified according to the orchestration result, and permission of a related access key may be suspended according to the orchestration result.

S5: Transmit the orchestration execution result and the unique verification code to a sender of the first orchestration script.

In this implementation, the multi-cloud service may send the returned execution result of the second orchestration script and the unique verification code corresponding to the second orchestration script to the user service together. The user service may audit, based on the orchestration execution result and the unique verification code, whether the multi-cloud service effectively processes the orchestration script and whether the cloud service provider provides the content network distribution service as required.

It can be seen from the description of the above implementations that, according to the technical solution provided in the present disclosure, when a user indirectly orchestrates content delivery network services provided by multiple cloud service providers through a multi-cloud service, trustworthiness and transparency of the multi-cloud service can be ensured. According to the technical solution provided in the present disclosure, the orchestration behavior of the multi-cloud service may be audited. When the content delivery network service runs below expectations, the technical solution provided in the present disclosure is beneficial to troubleshooting.

Figure 4:
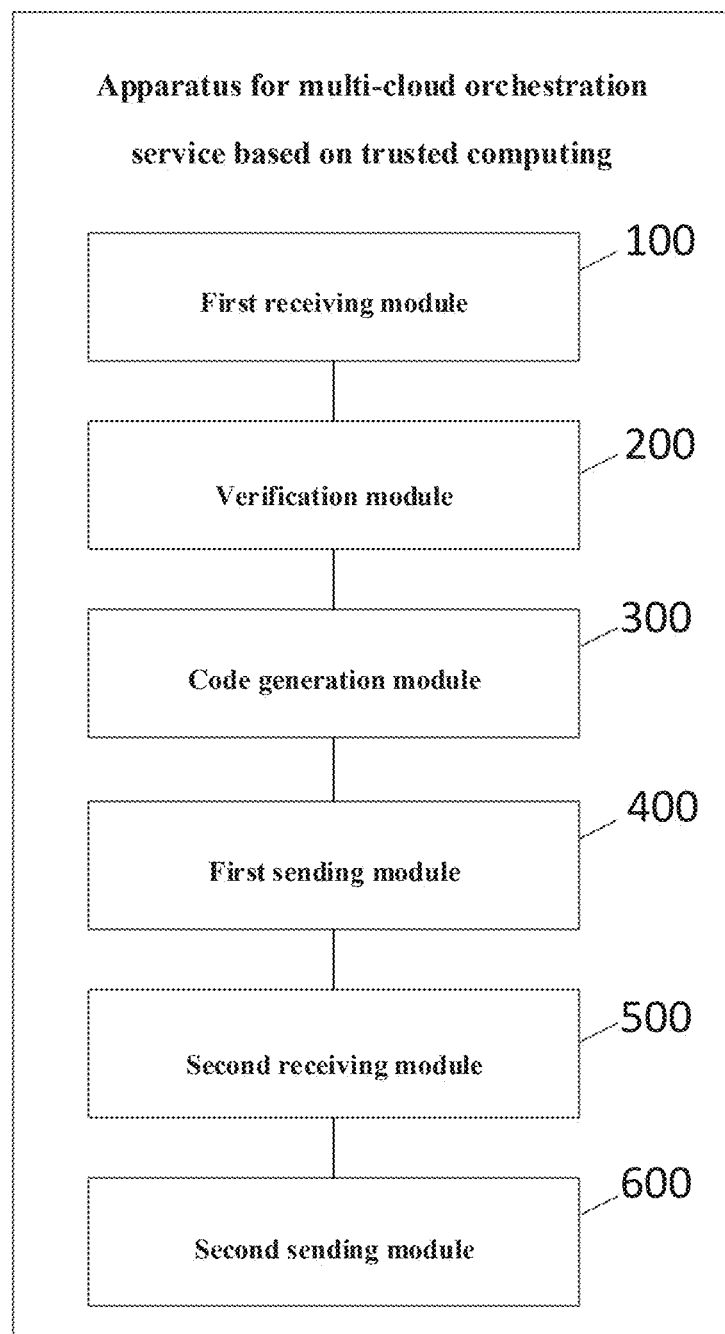
FIG. 4 is a schematic diagram of functional modules of an apparatus for CDN service orchestration in a multi-cloud environment according to an embodiment of the present disclosure.

Referring to FIG. 4, an implementation of the present disclosure further provides an apparatus for CDN service orchestration in a multi-cloud environment. The apparatus includes:

a first receiving module 100 configured to receive a first orchestration script, and the first orchestration script is used for orchestrating a content delivery network service provided by multiple target objects;

a verification module 200 configured to verify and store evidence of the first orchestration script in a trusted execution environment;

a code generation module 300 configured to generate, in the trusted execution environment, a unique verification code corresponding to a second orchestration script, where the second orchestration script is an orchestration script which is successfully verified in the first orchestration script;

a first sending module 400 configured to transmit the second orchestration script to a designated target object;

a second receiving module 500 configured to receive an orchestration execution result returned by the designated target object; and a second sending module 600 configured to transmit the orchestration execution result and the unique verification code to a sender of the first orchestration script.

In an implementation, the verification module 200 is further configured to: when the first orchestration script fails to be verified, terminate an execution of the first orchestration script, and generate a verification report indicating a reason for the verification failure.

In an implementation, the code generation module 300 is further configured to: after decrypting the second orchestration script with a signature public key in the trusted execution environment, generate the unique verification code corresponding to the second orchestration script, wherein the second orchestration script is encrypted by a sender of the second orchestration script with a signature private key before the second orchestration script is sent.

In an implementation, the verification module 200 is specifically configured to perform an identity verification on the first orchestration script to record a process and a result of the identity verification.

In an implementation, the verification module 200 is specifically configured to perform security auditing on the first orchestration script to record a process and a result of the security auditing.

In an implementation, the verification module 200 is specifically configured to perform an executable test on the first orchestration script to record a process and a result of the executable test.

In an implementation, the verification module 200 is specifically configured to: perform a static code analysis on the first orchestration script; perform dependency checking on the first orchestration script; and perform running behavior monitoring on the first orchestration script.

In an implementation, the code generation module 300 is specifically configured to: generate, in the trusted execution environment, a unique verification code corresponding to the second orchestration script, and the unique verification code includes at least one of the following: an identity identifier of an access key corresponding to the second orchestration script, a timestamp at which the second orchestration script is created or requested to be executed, a name or an identity identifier of the second orchestration script, a first hash value of content of the second orchestration script, or a second hash value of the second orchestration script carrying a user signature, wherein the user signature is created by a sender of the second orchestration script with a signature private key before the second orchestration script is sent.

In an implementation, the second receiving module 500 is specifically configured to: receive the orchestration execution result returned by the designated target object, and the orchestration execution result includes at least one of the following: an operation record and resource call information corresponding to successful execution of the second orchestration script, a reason for failure and diagnostic information corresponding to failure of execution of the second orchestration script, or alarm information triggered by a security or integrity issue with the second orchestration script.

Figure 5:
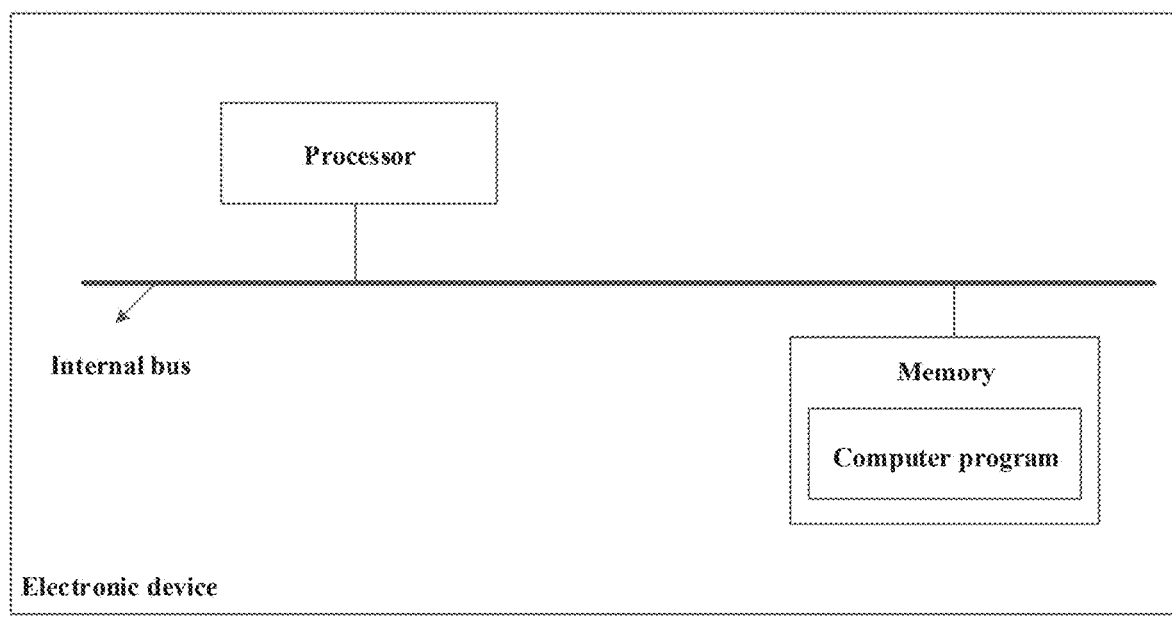
FIG. 5 is a schematic structural diagram of a computer device according to an embodiment of the present disclosure.

Referring to FIG. 5, the present disclosure further provides a computer device. The computer device includes a memory and a processor. The memory is configured to store a computer program. The computer program, when executed by the processor, implements the CDN service orchestration method in the multi-cloud environment described above.

The present disclosure further provides a computer-readable storage medium. The computer-readable storage medium is configured to store a computer program. The computer program, when executed by a processor, implements the CDN service orchestration method in the multi-cloud environment described above.

The processor may be a central processing unit (CPU). The processor may also be another general-purpose processor, a digital signal processor (DSP), an application-specific integrated circuit (ASIC), a field-programmable gate array (FPGA), or another programmable logic device, a discrete gate or transistor logic device, a discrete hardware component, or a combination of the above chips.

The memory, as a non-transitory computer-readable storage medium, may be configured to store a non-transitory software program, a non-transitory computer-executable program, and a module, such as program instructions/modules corresponding to the method in the implementations of the present disclosure. The processor executes various functional applications and data processing of the processor by running the non-transitory software program, instructions, and modules stored in the memory, that is, implements the method in the method implementations described above.

The memory may include a program storage region and a data storage region. The program storage region may store an operating system and applications required for at least one function. The data storage region may store data created by the processor. In addition, the memory may include a high-speed random-access memory, and may also include a non-transitory memory, for example, at least one magnetic disk storage device, flash memory device, or other non-transitory solid-state storage device. In some implementations, the memory alternatively includes a memory provided remotely relative to the processor, and these remote memories may be connected to the processor through a network. Examples of the network include but are not limited to the Internet, an intranet, a local area network, a mobile communication network, and a combination thereof.

It may be understood by those skilled in the art that all or part of the processes in the methods of the above embodiments may be implemented by a computer program instructing related hardware. The program may be stored in a computer-readable storage medium. When the program is executed, the processes of the method embodiments described above may be included. The storage medium may be a magnetic disk, an optical disc, a read-only memory (ROM), a random-access memory (RAM), a flash memory, a hard disk drive (HDD), or a solid-state drive (SSD). The storage medium may also include a combination of the foregoing types of memories.

All the embodiments in this specification are described in a progressive manner. For the same or similar parts in the embodiments, reference may be made to each other, and each embodiment focuses on differences from other embodiments. In particular, for the embodiments of the apparatus and device, because they are basically similar to the method embodiments, the description is relatively simple, and reference may be made to the description of some parts of the method embodiments for related parts.

The above are merely embodiments of the present application, and are not intended to limit the present application. For those skilled in the art, the present application may have various modifications and changes. All modifications, equivalent replacements, improvements, and the like made within the spirit and principles of the present application shall be included in the scope of the claims of the present application.

Although the implementations of the present disclosure are described with reference to the drawings, those skilled in the art may make various modifications and variations without departing from the spirit and scope of the present disclosure, and such modifications and variations all fall within the scope defined by the appended claims.

We claim:

1. A method for a content delivery network (CDN) service management in a multi-cloud environment, comprising:
   receiving a first management script, wherein the first management script is used for managing a CDN service provided by a plurality of target objects;
   verifying and storing evidence of the first management script in a trusted execution environment;
   generating, in the trusted execution environment, a unique verification code corresponding to a second management script, wherein the second management script is a management script which is successfully verified in the first management script;
   transmitting the second management script to a designated target object, and receiving a management execution result returned by the designated target object; and
   transmitting the management execution result and the unique verification code to a sender of the first management script.

2. The method of claim 1, wherein verifying and storing the evidence of the first management script comprises at least one of:
   performing an identity verification on the first management script to record a process and a result of the identity verification;
   performing security auditing on the first management script to record a process and a result of the security auditing; or
   performing an executable test on the first management script to record a process and a result of the executable test.

3. The method of claim 2, wherein performing the security auditing on the first management script comprises at least one of:
   performing a static code analysis on the first management script;
   performing dependency checking on the first management script; or
   performing running behavior monitoring on the first management script.

4. The method of claim 1, wherein verifying and storing the evidence of the first management script comprises:
   in response to the first management script failing to be verified, terminating an execution of the first management script, generating a verification report indicating a reason for the verification failure.

5. The method of claim 1, wherein generating, in the trusted execution environment, the unique verification code corresponding to the second management script comprises:
   encrypting, by a sender of the second management script, the second management script with a signature private key before sending the second management script; and
   after decrypting the second management script with a signature public key in the trusted execution environment, generating the unique verification code corresponding to the second management script.

6. The method of claim 1, wherein the unique verification code corresponding to the second management script comprises at least one of:
- an identity identifier of an access key corresponding to the second management script;
- a timestamp at which the second management script being created or requested to be executed;
- a name or an identity identifier of the second management script;
- a first hash value of content of the second management script; or
- a second hash value of the second management script carrying a user signature, wherein the user signature is created by a sender of the second management script with a signature private key before sending the second management script.

7. The method of claim 1, wherein the management execution result comprises at least one of:
- an operation record and resource call information corresponding to successful execution of the second management script;
- a reason for failure and diagnostic information corresponding to a failure of execution of the second management script; or
- alert information triggered by a security or integrity issue of the second management script.

8. A computer device, comprising a memory and a processor, wherein the memory stores a computer program, and the processor, when executing the computer program, causes the processor to:
- receive a first management script, wherein the first management script is used for managing a CDN service provided by a plurality of target objects;
- verify and storing evidence of the first management script in a trusted execution environment;
- generate, in the trusted execution environment, a unique verification code corresponding to a second management script, wherein the second management script is an management script which is successfully verified in the first management script;
- transmit the second management script to a designated target object, and receiving a management execution result returned by the designated target object; and
- transmit the management execution result and the unique verification code to a sender of the first management script.

9. The device of claim 8, wherein the computer program causing the processor to verify and store the evidence of the first management script comprises computer program causing the processor to:
- perform an identity verification on the first management script to record a process and a result of the identity verification;
- perform security auditing on the first management script to record a process and a result of the security auditing; or
- perform an executable test on the first management script to record a process and a result of the executable test.

10. The device of claim 9, wherein the computer program causing the processor to perform the security auditing on the first management script comprises computer program causing the processor to:
- perform a static code analysis on the first management script;
- perform dependency checking on the first management script; or
- perform running behavior monitoring on the first management script.

11. The device of claim 8, wherein the computer program causing the processor to verify and store the evidence of the first management script comprises computer program causing the processor to:
- in response to the first management script failing to be verified, terminate an execution of the first management script, generate a verification report indicating a reason for the verification failure.

12. The device of claim 8, wherein the computer program causing the processor to generating, in the trusted execution environment, the unique verification code corresponding to the second management script comprises computer program causing the processor to:
- encrypt, by a sender of the second management script, the second management script with a signature private key before sending the second management script; and
- after decrypting the second management script with a signature public key in the trusted execution environment, generate the unique verification code corresponding to the second management script.

13. The device of claim 8, wherein the unique verification code corresponding to the second management script comprises at least one of:
- an identity identifier of an access key corresponding to the second management script;
- a timestamp at which the second management script being created or requested to be executed;
- a name or an identity identifier of the second management script;
- a first hash value of content of the second management script; or
- a second hash value of the second management script carrying a user signature, wherein the user signature is created by a sender of the second management script with a signature private key before sending the second management script.

14. The device of claim 8, wherein the management execution result comprises at least one of:
- an operation record and resource call information corresponding to successful execution of the second management script;
- a reason for failure and diagnostic information corresponding to a failure of execution of the second management script; or
- alert information triggered by a security or integrity issue of the second management script.

15. A non-transitory computer-readable storage medium, storing a computer program thereon, wherein the computer program, when executed by a processor, causes the processor to perform:
- receive a first management script, wherein the first management script is used for managing a CDN service provided by a plurality of target objects;
- verify and storing evidence of the first management script in a trusted execution environment;
- generate, in the trusted execution environment, a unique verification code corresponding to a second management script, wherein the second management script is a management script which is successfully verified in the first management script;
- transmit the second management script to a designated target object, and receiving a management execution result returned by the designated target object; and transmit the management execution result and the unique verification code to a sender of the first management script.

16. The medium of claim 15, wherein the computer program causing the processor to verify and store the evidence of the first management script comprises computer program causing the processor to:
perform an identity verification on the first management script to record a process and a result of the identity verification;
perform security auditing on the first management script to record a process and a result of the security auditing; or
perform an executable test on the first management script to record a process and a result of the executable test.

17. The medium of claim 16, wherein the computer program causing the processor to perform the security auditing on the first management script comprises computer program causing the processor to:
perform a static code analysis on the first management script;
perform dependency checking on the first management script; or
perform running behavior monitoring on the first management script.

18. The medium of claim 15, wherein the computer program causing the processor to verify and store the evidence of the first management script comprises computer program causing the processor to:
in response to the first management script failing to be verified, terminate an execution of the first management script, generate a verification report indicating a reason for the verification failure.

19. The medium of claim 15, wherein the computer program causing the processor to generating, in the trusted execution environment, the unique verification code corresponding to the second management script comprises computer program causing the processor to:
encrypt, by a sender of the second management script, the second management script with a signature private key before sending the second management script; and
after decrypting the second management script with a signature public key in the trusted execution environment, generate the unique verification code corresponding to the second management script.

20. The medium of claim 15, wherein the unique verification code corresponding to the second management script comprises at least one of:
an identity identifier of an access key corresponding to the second management script;
a timestamp at which the second management script being created or requested to be executed;
a name or an identity identifier of the second management script;
a first hash value of content of the second management script; or
a second hash value of the second management script carrying a user signature, wherein the user signature is created by a sender of the second management script with a signature private key before sending the second management script.

* * * * *